United States Patent
Luo

(10) Patent No.: US 11,296,603 B2
(45) Date of Patent: Apr. 5, 2022

(54) MODE SWITCHING CIRCUIT AND MODE SWITCHING METHOD FOR SWITCHING POWER SUPPLY

(71) Applicant: Silergy Semiconductor Technology (Hangzhou) LTD, Hangzhou (CN)

(72) Inventor: Di Luo, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 59 days.

(21) Appl. No.: 16/865,610

(22) Filed: May 4, 2020

(65) Prior Publication Data

US 2020/0366207 A1 Nov. 19, 2020

(30) Foreign Application Priority Data

May 13, 2019 (CN) .......................... 201910394270.8

(51) Int. Cl.
*H02M 3/158* (2006.01)
*H02M 1/08* (2006.01)
*H02M 1/00* (2006.01)
*H02M 3/156* (2006.01)

(52) U.S. Cl.
CPC ............ *H02M 3/1588* (2013.01); *H02M 1/08* (2013.01); *H02M 1/0032* (2021.05); *H02M 3/1566* (2021.05)

(58) Field of Classification Search
CPC .... H02M 3/1588; H02M 1/08; H02M 1/0032; H02M 3/1566; H02M 3/156; Y02B 70/10
See application file for complete search history.

(56) References Cited

U.S. PATENT DOCUMENTS

| | | | |
|---|---|---|---|
| 8,115,402 B2 | 2/2012 | Kuang et al. | |
| 8,242,763 B2* | 8/2012 | Pigott | H02M 3/1588 323/284 |
| 8,400,790 B2 | 3/2013 | Zhang et al. | |
| 8,692,532 B2* | 4/2014 | Lopata | H02M 3/1588 323/284 |
| 9,054,592 B2 | 6/2015 | Yao et al. | |
| 9,054,597 B2 | 6/2015 | Zhao et al. | |
| 9,287,793 B2 | 3/2016 | Zhang et al. | |
| 9,391,511 B2 | 7/2016 | Yu et al. | |
| 9,537,390 B2 | 1/2017 | Mao et al. | |
| 9,577,533 B2 | 2/2017 | Yu et al. | |
| 9,685,868 B2* | 6/2017 | de Cremoux | H02M 3/157 |
| 10,763,738 B1* | 9/2020 | Dharmalinggam | H02M 3/158 |
| 2008/0246455 A1* | 10/2008 | Chu | H02M 3/1588 323/283 |
| 2009/0027024 A1* | 1/2009 | Dequina | H02M 3/1588 323/283 |
| 2011/0084677 A1 | 4/2011 | Sji et al. | |
| 2012/0112795 A1 | 5/2012 | Wang et al. | |
| 2013/0038302 A1 | 2/2013 | Qian et al. | |

(Continued)

*Primary Examiner* — Kyle J Moody

(57) ABSTRACT

A mode switching circuit for a switching power supply having a power switch and a synchronous switch is configured to: control the switching power supply to switch between a first mode and a second mode in response to a transitioning of a load of the switching power supply, in order to suppress overshoot of an output voltage of the switching power supply; where an inductor current of the switching power supply is not less than zero in the first mode; and where the inductor current is allowed to be less than zero in the second mode.

18 Claims, 6 Drawing Sheets

(56) References Cited

U.S. PATENT DOCUMENTS

| | | | |
|---|---|---|---|
| 2014/0176107 A1 | 6/2014 | Yu et al. | |
| 2014/0300329 A1* | 10/2014 | Thompson | H02M 3/156 323/235 |
| 2015/0028825 A1 | 1/2015 | Mao | |

* cited by examiner

MODE SWITCHING CIRCUIT AND MODE SWITCHING METHOD FOR SWITCHING POWER SUPPLY

RELATED APPLICATIONS

This application claims the benefit of Chinese Patent Application No. 201910394270.8, filed on May 13, 2019, which is incorporated herein by reference in its entirety.

FIELD OF THE INVENTION

The present invention generally relates to the field of power electronics, and more particularly to mode switching circuits and methods for switching power supplies.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Taking a synchronous rectifier buck converter as an example, a traditional switching power supply utilizes a synchronous switch for regulating an output voltage, and the synchronous switch is turned off when an inductor current to be sensed crosses zero. This can result in overshoot of the output voltage of the switching power supply when the load of the switching power supply switches from a heavy load to a light load. Further, the charge on the output capacitor may only be discharged from the load, and the discharge speed of the output capacitor can be slow, resulting in the poor dynamic response of the switching power supply.

In one embodiment, mode switching circuit for a switching power supply having a power switch and a synchronous switch, the mode switching circuit being configured to: (i) control the switching power supply to switch between a first mode and a second mode in response to a transitioning of a load of the switching power supply, in order to suppress overshoot of an output voltage of the switching power supply; (ii) where an inductor current of the switching power supply is not less than zero in the first mode; and (iii) where the inductor current is allowed to be less than zero in the second mode.

Figure 1:
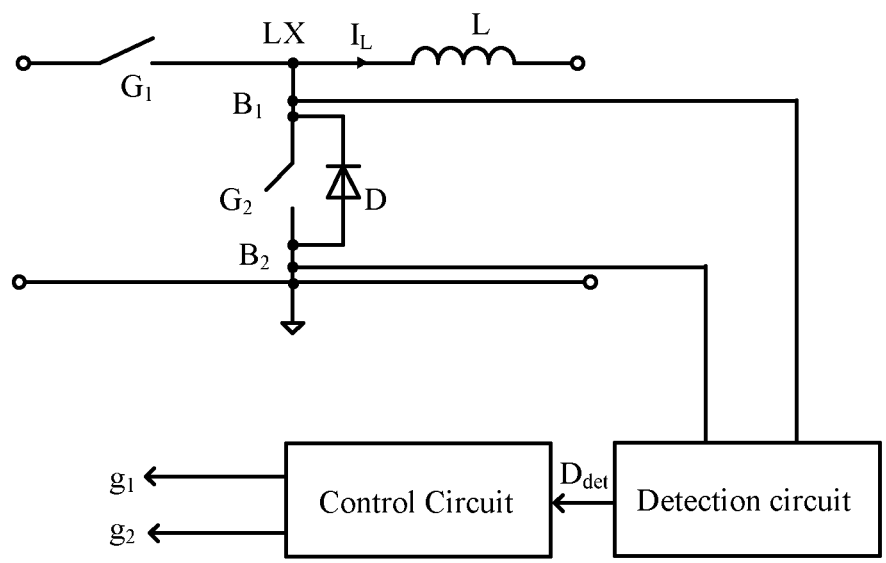
FIG. 1 is a schematic block diagram of a first example mode switching circuit of a switching power supply, in accordance with embodiments of the preset invention.

Referring now to FIG. 1, shown is a schematic block diagram of a first example mode switching circuit of a switching power supply, in accordance with embodiments of the preset invention. In this particular example, the switching power supply is a synchronous rectified buck converter; however, other topologies (e.g., boost, buck-boost, etc.) can also be used in certain embodiments. The buck converter can include main power switch $G_1$, synchronous switch $G_2$, and inductor L. Main power switch $G_1$ and synchronous switch $G_2$ can connect in series between input terminals of the switching power supply. One terminal of inductor L can connect to terminal LX between power switch $G_1$ and synchronous switch $G_2$ The other terminal of inductor L can connect to an output terminal of the switching power supply. An output capacitor can connect to output terminals of the switching power supply in order to generate an output voltage. Typically, power switch $G_1$ and synchronous switch $G_2$ are MOSFETs with parasitic body diodes, and body diode D of synchronous switch $G_2$ is shown in this example.

In this example, the mode switching circuit can include a detection circuit and a control circuit. The detection circuit can detect a voltage across synchronous switch $G_2$ to generate detection signal $Da_{det}$, in order to determine whether body diode D of synchronous switch $G_2$ is turned on when synchronous switch $G_2$ is turned off. The control circuit can control the switching power supply to operate in a first mode or a second mode in response to detection signal $Da_{det}$, and may generate drive signals g1 and g2 for controlling power switch $G_1$ and synchronous switch $G_2$ respectively. In addition, in the first mode, the switching power supply may detect a zero-crossing of inductor current $I_L$, and can generate a zero-crossing detection signal in order to control synchronous switch $G_2$ to turn off when inductor current $I_L$ crosses zero. In the second mode, inductor current $I_L$ is allowed to be less than zero, and the zero-crossing of inductor current $I_L$ may not need to be detected. Therefore, in the first mode, inductor current $I_L$ is not less than zero, and in the second mode inductor current $I_L$ may always be continuous and can be less than zero.

For example, when the switching power supply operates in the first mode, power switch $G_1$ can be turned on for a fixed time, and inductor current $I_L$ may increase. After power switch $G_1$ is turned off, synchronous switch $G_2$ can be turned on, inductor current $I_L$ may continue to flow through body diode D of synchronous switch $G_2$, and inductor current $I_L$ can decrease gradually. At this time, if the load is heavy, inductor current $I_L$ can be continuous and may not drop to zero, and synchronous switch $G_2$ is turned off before power switch $G_1$ is turned on again. If the load "transitions," "changes," or "jumps" from a heavy load to a light load, inductor current $I_L$ may be discontinuous. When inductor current $I_L$ crosses zero, synchronous switch $G_2$ can be turned off, and power switch $G_1$ may remain on for a fixed time, resulting in overshoot of the output voltage of the switching power supply. In addition, the charge on the output capacitor may only be discharged from the load, and the discharge speed of the output capacitor can be slow, resulting in the poor dynamic response of the switching power supply.

When the switching power supply operates in the second mode, power switch $G_1$ can be turned on for a fixed time, and inductor current $I_L$ may increase. Further, synchronous switch $G_2$ can be turned on after power switch $G_1$ is turned off, inductor current $I_L$ may continue to flow through body diode D of synchronous switch $G_2$, and inductor current $I_L$ may drop. At this time, if the load is heavy, inductor current $I_L$ can be continuous, which is the same as the first mode, and synchronous switch $G_2$ may be turned off when power switch $G_1$ is turned on again. If the load transitions from a heavy load to a light load, since inductor current $I_L$ can be allowed to be negative (e.g., less than zero) in the second mode, and synchronous switch $G_2$ can remain on after inductor current $I_L$ crosses zero, such that inductor current $I_L$ flows through synchronous switch $G_2$ and increases in the reverse direction. In this way, the energy on the output capacitor can continue to release, and the output voltage may not overshoot. Synchronous switch $G_2$ can be turned off until power switch $G_1$ is turned on again, such that inductor current $I_L$ is always continuous. However, in the second mode, due to inductor current $I_L$ being less than zero, the power loss of the switching power supply can be relatively large and the efficiency relatively low.

In particular embodiments, when the load is heavy, the control circuit can control the switching power supply to operate in the second mode in response to detection signal $D_{det}$. Since inductor current $I_L$ is allowed to be negative in the second mode (e.g., less than zero), when the load transitions from a heavy load to a light load, the switching power supply can be switched from continuous conduction mode (CCM) to forced continuous conduction mode (FCCM), in order to suppress the overshoot of the output voltage. After the switching power supply operates in FCCM for a predetermined number of cycles, the switching power supply can be controlled to operate in the first mode. Since the load is light in the first mode, the switching power supply may operate in discontinuous conduction mode (DCM), and synchronous switch $G_2$ can be turned off when inductor current $I_L$ crosses zero, thereby ensuring the efficiency of the switching power supply under the condition of the light load. Further, when the load transitions from a light load to a heavy load in the first mode, the switching power supply may be switched from a DCM to a CCM. After the switching power supply operates in CCM for a predetermined number of cycles, the control circuit can switch the switching power supply to the second mode to operate again.

Figure 2:
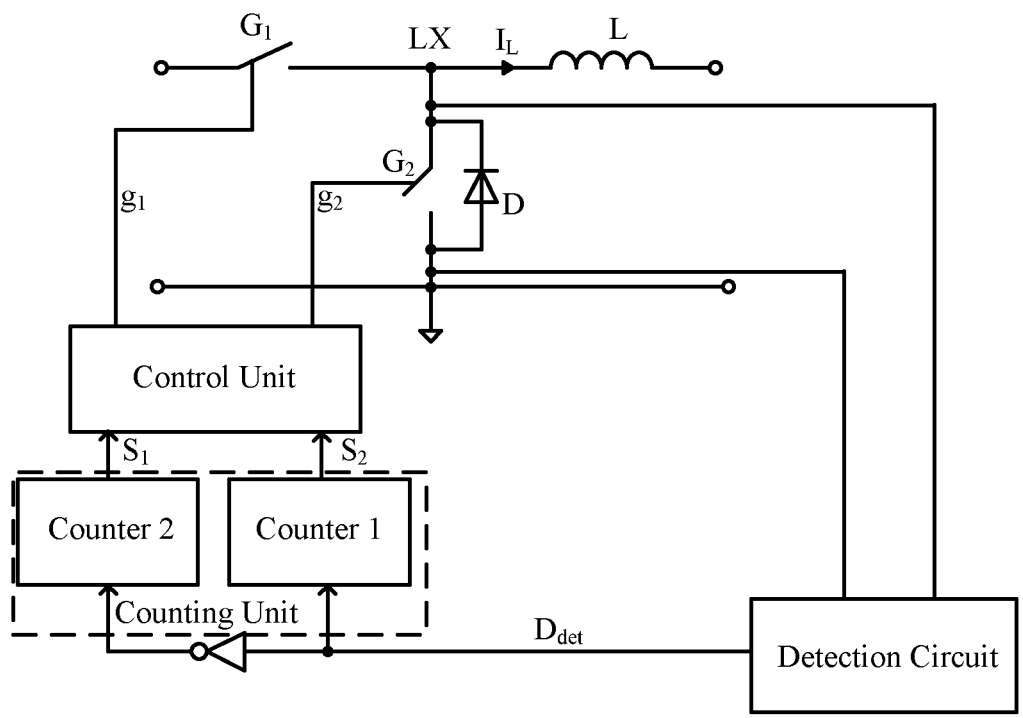
FIG. 2 is a schematic block diagram of a second example mode switching circuit of a switching power supply, in accordance with embodiments of the preset invention.

Referring now to FIG. 2, shown is a schematic block diagram of a second example mode switching circuit of a switching power supply, in accordance with embodiments of the preset invention. This example mode switching circuit can include a detection circuit and a control circuit. The control circuit can include a counting unit and a control unit. To prevent shoot-through of the switching power supply, a dead time may be set in the switching sequence of power switch $G_1$ and synchronous switch $G_2$. When synchronous switch $G_2$ is turned off, power switch $G_1$ can be turned on after the dead time has elapsed. During this dead time, power switch $G_1$ and synchronous switch $G_2$ may be turned off, and inductor current $I_L$ can continue to flow through body diode D of synchronous switch $G_2$ for freewheeling.

If the load of the switching power supply is heavy, inductor current $I_L$ may not have decreased to zero when synchronous switch $G_2$ is turned off, and body diode D of synchronous switch $G_2$ can be turned on. If the load of the switching power supply is light, inductor current $I_L$ may have been reduced to zero or even below zero when synchronous switch $G_2$ is turned off, and body diode D may not be turned on. Therefore, the detection circuit can determine the relationship between the valley point of inductor current $I_L$ and a zero value in each cycle by determining whether body diode D of synchronous switch $G_2$ is turned on when synchronous switch $G_2$ is turned off, in order to generate detection signal $D_{det}$. In this way, whether the switching power supply operates under the condition of a heavy load or a light load can be indirectly determined in accordance with detection signal $D_{det}$.

In one example, the counting unit can include counter 1 and counter 2. Counter 1 can start counting when detection signal $D_{det}$ is active, and can generate second mode switching signal $S_2$ when counting to a predetermined value. Counter 2 can start counting when detection signal $D_{det}$ is inactive, and may generate first mode switching signal $S_1$ when counting to a predetermined value. The control unit can receive first mode switching signal $S_1$ and second mode switching signal $S_2$, and may generate driving signals g1 and g2 for power switch $G_1$ and synchronous switch $G_2$ according to different control logics, in order to control the switching power supply to operate in the first mode or second mode. It should be understood that the counting unit in this particular example utilizes two counters to count in different operating modes, and those skilled in the art will recognize that one counter together with corresponding logic control can also be used to achieve the same function.

Figure 3:
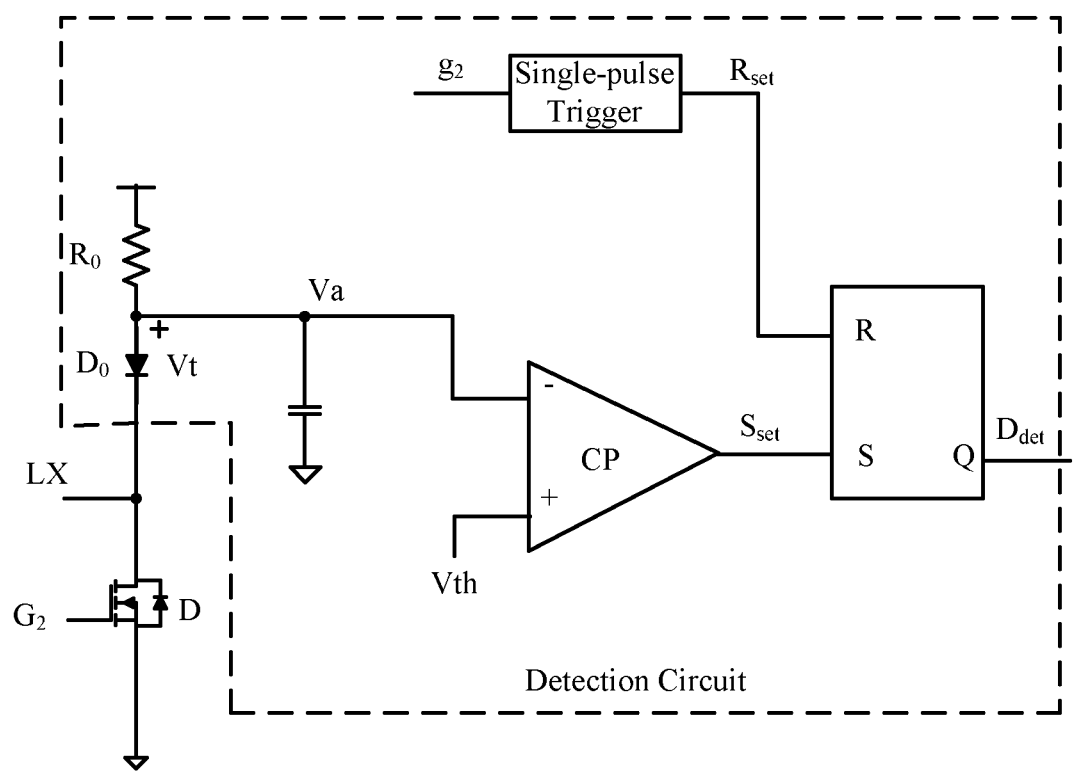
FIG. 3 is a schematic block diagram of an example detection circuit in the mode switching circuit of the example switching power supply, in accordance with embodiments of the preset invention.

Referring now to FIG. 3, shown is a schematic block diagram of an example detection circuit in the mode switching circuit of the example switching power supply, in accordance with embodiments of the preset invention. This example detection circuit can include comparator CP, an RS flip-flop, and a single-pulse trigger. The non-inverting input terminal of comparator CP can receive threshold voltage Vth, and the inverting input terminal of comparator CP can receive comparison voltage Va. Also, comparison voltage Va is generated by the voltage across body diode D of synchronous switch $G_2$ (e.g., a voltage at terminal LX) can be superimposed on conduction voltage drop Vt of diode $D_0$. In this example, the specification parameters of diode $D_0$ are basically the same as body diode D, such that when body diode D is turned on, the conduction voltage drop of body diode D and conduction voltage drop Vt of diode $D_0$ can cancel each other, and comparison voltage Va is close to zero. When body diode D is off, there are two cases for comparison voltage Va. In a first case, when the switching power supply operates in a DCM during the first mode, the voltage at terminal LX is approximately zero, such that comparison voltage Va is configured to be conduction voltage drop Vt of diode $D_0$.

In a second case, when the switching power supply operates in an FCCM during the second mode, since inductor current $I_L$ is less than zero when synchronous switch $G_2$ is turned off, inductor current $I_L$ flows from the output terminal to the input terminal of the switching power supply, such that the voltage at terminal LX is greater than the input voltage of the switching power supply. That is, comparison voltage Va is configured to be greater than the input voltage. Therefore, threshold voltage Vth can be set to be greater than zero and less than conduction voltage drop Vt of diode $D_0$. In this way, when synchronous switch $G_2$ is turned off and body diode D is off, comparison voltage Va can be greater than threshold voltage Vth. When synchronous switch $G_2$ is turned off and body diode D is turned on, comparison voltage Va can be less than threshold voltage Vth.

The single-pulse trigger can receive driving signal g2 of synchronous switch $G_2$, and may be triggered by its falling edge, in order to generate reset signal $R_{set}$ provided to reset terminal R of the RS flip-flop. Set terminal S of the RS flip-flop can receive output signal $S_{set}$ of comparator CP, and output terminal Q of RS flip-flop can generate detection signal $D_{det}$. Therefore, reset signal $R_{set}$ can reset the RS flip-flop when synchronous switch $G_2$ is turned off in each switching cycle. When body diode D is turned on, comparison voltage Va may be less than threshold voltage Vth, and output signal $S_{set}$ of comparator CP and detection signal $D_{det}$ can be active, such that the switching power supply operates under the heavy load condition. When body diode D is off, comparison voltage Va can be greater than threshold voltage Vth, and output signal $S_{set}$ of comparator CP and detection signal $D_{det}$ can be inactive, such that the switching power supply operates under the light load condition.

Figure 4:
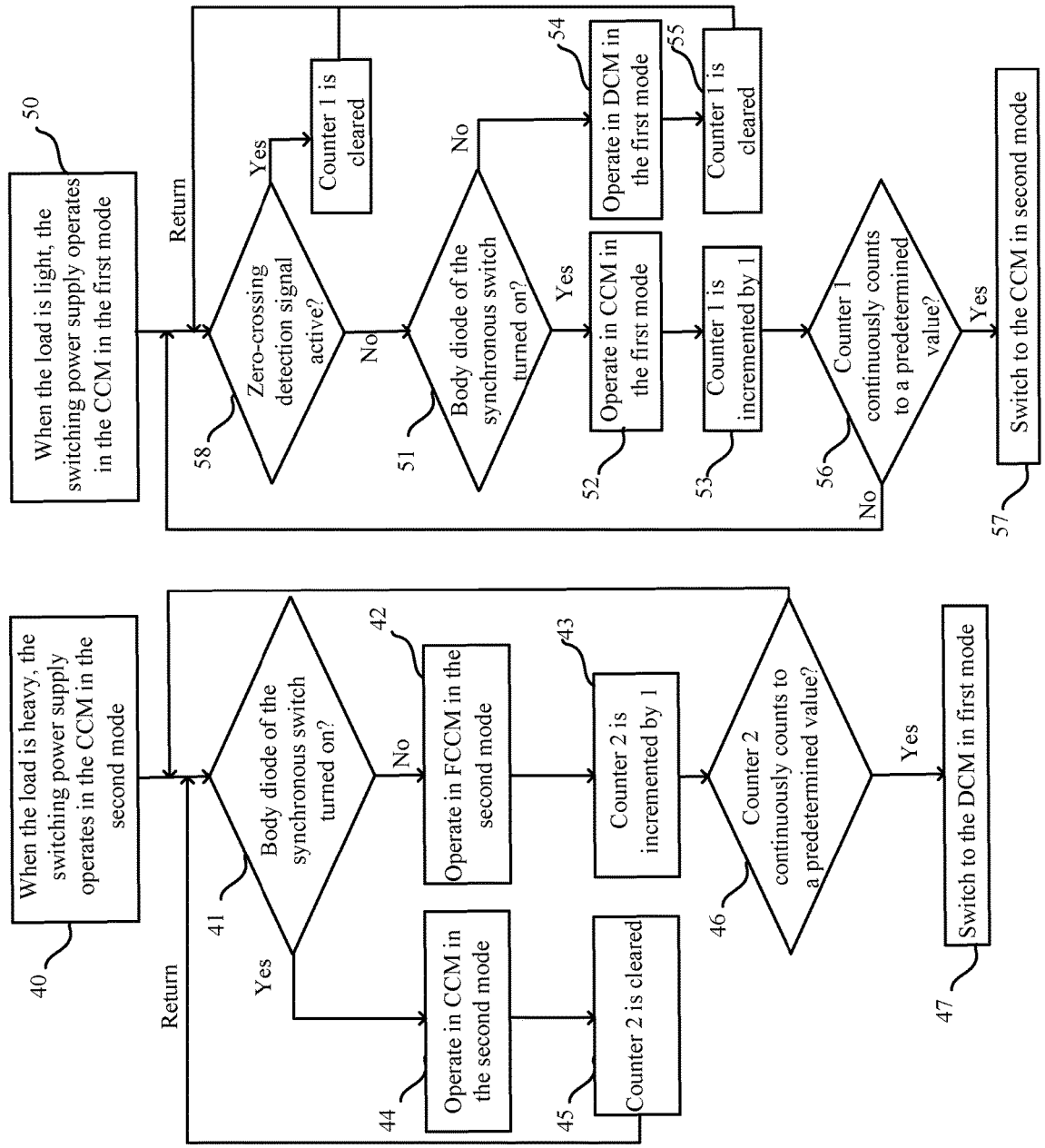
FIG. 4 is a flow diagram of an example mode switching method for a switching power supply, in accordance with embodiments of the preset invention.

Referring now to FIG. 4, shown is a flow diagram of an example mode switching method for a switching power supply, in accordance with embodiments of the preset invention. Referring also to the examples of FIGS. 2 and 3. At block 40, when the load is heavy, the switching power supply can operate in a CCM in the second mode. At block 41, whether body diode D of synchronous switch $G_2$ is turned on can be determined when synchronous switch $G_2$ is turned off. At block 42, if body diode D is off, this can indicate that the load transitions from a heavy load to a light load at this time, such that the switching power supply operates in an FCCM in the second mode and detection signal $D_{det}$ is inactive. At block 43, counter 2 may begin to count up due to inactive detection signal $D_{det}$. Further, counter 2 can be incremented by 1 when body diode D is detected to be off when synchronous tube $G_2$ is turned off in each cycle.

At block 44, the switching power supply can operate in a CCM in the second mode when body diode D is detected to be turned on when synchronous tube $G_2$ is turned off (e.g., a sudden change of the load from light load to heavy load). At block 45, counter 2 can be cleared and recounted. At block 46, whether counter 2 continuously counts to a predetermined value can be determined. At block 47, when counter 2 continuously counts to the predetermined value, counter 2 can generate first mode switching signal $S_1$, such that the switching power supply switches from the second mode to the first mode, and may operate in a DCM due to the light load. In the first mode, when inductor current $I_L$ crosses zero, synchronous switch $G_2$ can be turned off. When the switching power supply switches from the second mode to the first mode, counter 2 can be cleared and stops operating, and counter 1 may start operating. To prevent misjudgment and to improve accuracy, counters 1 and 2 can be set to count to the predetermined value.

At block 50, when the load is light, the switching power supply can operate in a DCM in the first mode. At block 51, whether body diode D of synchronous switch $G_2$ is turned on can be determined when synchronous switch $G_2$ is turned off. At block 52, if body diode D is turned on, this can indicate that the load has gradually increased, such that the switching power supply can operate in a CCM in the first mode. At block 53, counter 1 can start to count up due to active detection signal $D_{det}$. Further, counter 1 can be incremented by 1 when body diode D is detected to be turned on in each cycle. At block 54, if body diode D is off, this can indicate that the load remains light, such that the switching power supply can operate in a DCM in the first mode. At block 55, counter 1 can be cleared and recounted when body diode D is detected to be off when synchronous switch $G_2$ is turned off (e.g., the load remains light). At block 56, whether counter 1 continuously counts to a predetermined value can be determined.

At block 57, when counter 1 counts to a predetermined value, counter 1 can generate second mode switching signal $S_2$, such that the switching power supply is controlled to enter the second mode, and may operate in a CCM. Then, counter 1 can be cleared and stops operating, and counter 2 may begin operating. In addition, at block 58, the zero-crossing detection signal of inductor current $I_L$ can also be detected, and whether the zero-crossing detection signal is active can be determined. Also, the turn-off state of synchronous switch $G_2$ can be controlled in accordance with the zero-crossing detection signal. At block 59, if the zero-crossing detection signal is active, counter 1 can also be cleared, in order to avoid misjudgment caused by the transient negative voltage generated when synchronous switch $G_2$ is turned off.

Figure 5:
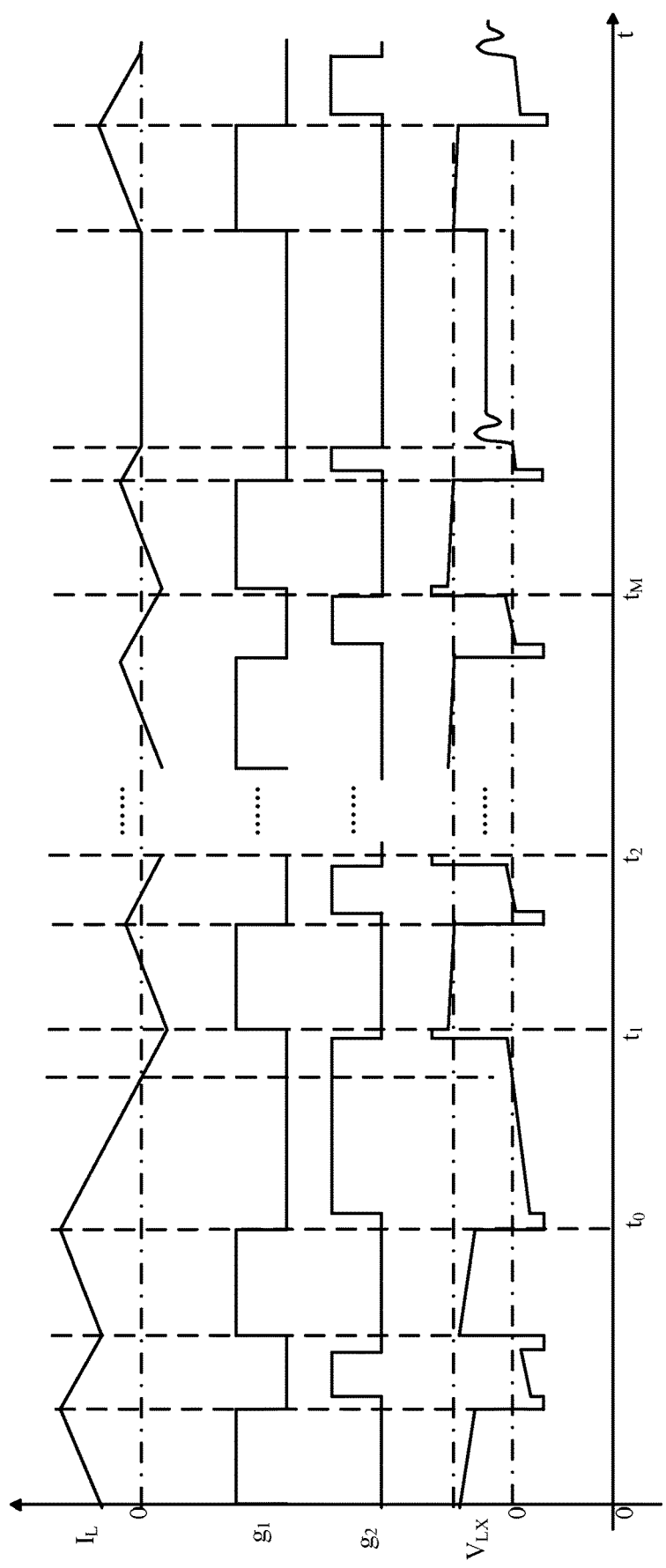
FIG. 5 is a waveform diagram of first example operation of the example mode switching circuit, in accordance with embodiments of the preset invention.

Referring now to FIG. 5, shown is a waveform diagram of first example operation of the example mode switching circuit, in accordance with embodiments of the preset invention. This particular example shows operation of the switching power supply in switching from a heavy load to a light load, and the waveforms of inductor current $I_L$, driving signal g1 of main power switch $G_1$, driving signal g2 of synchronous switch $G_2$, and voltage $V_{LX}$ at terminal LX varying with time are shown from top to bottom. Before time $t_0$, the switching power supply operates in a CCM in the second mode. When synchronous switch $G_2$ is turned off (e.g., corresponding to the falling edge of driving signal g2), inductor current $I_L$ is greater than zero, such that inductor current $I_L$ continues to flow through body diode D of synchronous switch $G_2$ for freewheeling. That is, body diode D is turned on when synchronous switch $G_2$ is turned off. At this time, detection signal $D_{det}$ generated by the detection circuit can be active and counter 2 may not count, and the switching power supply can operate under the heavy load condition.

When the load becomes lighter, inductor current $I_L$ may gradually decrease. At time $t_0$, the switching power supply can enter into an FCCM, and inductor current $I_L$ can be allowed to be negative. At this time, when synchronous switch $G_2$ is turned off, inductor current $I_L$ can increase to a valley value in a reverse direction, and body diode D may be off, such that comparison voltage Va is greater than threshold voltage Vth, and detection signal $D_{det}$ is inactive. In this way, counter 2 can count up when detection signal $D_{det}$ generated by the detection circuit is detected to be inactive in each cycle (e.g., when body diode D is off when synchronous switch $G_2$ is turned off). At time $t_M$, counter 2 may have continuously counted m times (e.g., 5 times), and the switching power supply can be controlled by the control circuit to switch to the first mode. When inductor current $I_L$ crosses zero, synchronous switch $G_2$ can be turned off. In this example, the switching power supply can accurately be switched from the second mode to the first mode in the critical region of inductor current $I_L$ (e.g., close to zero) when the load switches from a heavy load to a light load, thereby suppressing overshoot of the output voltage.

Figure 6:
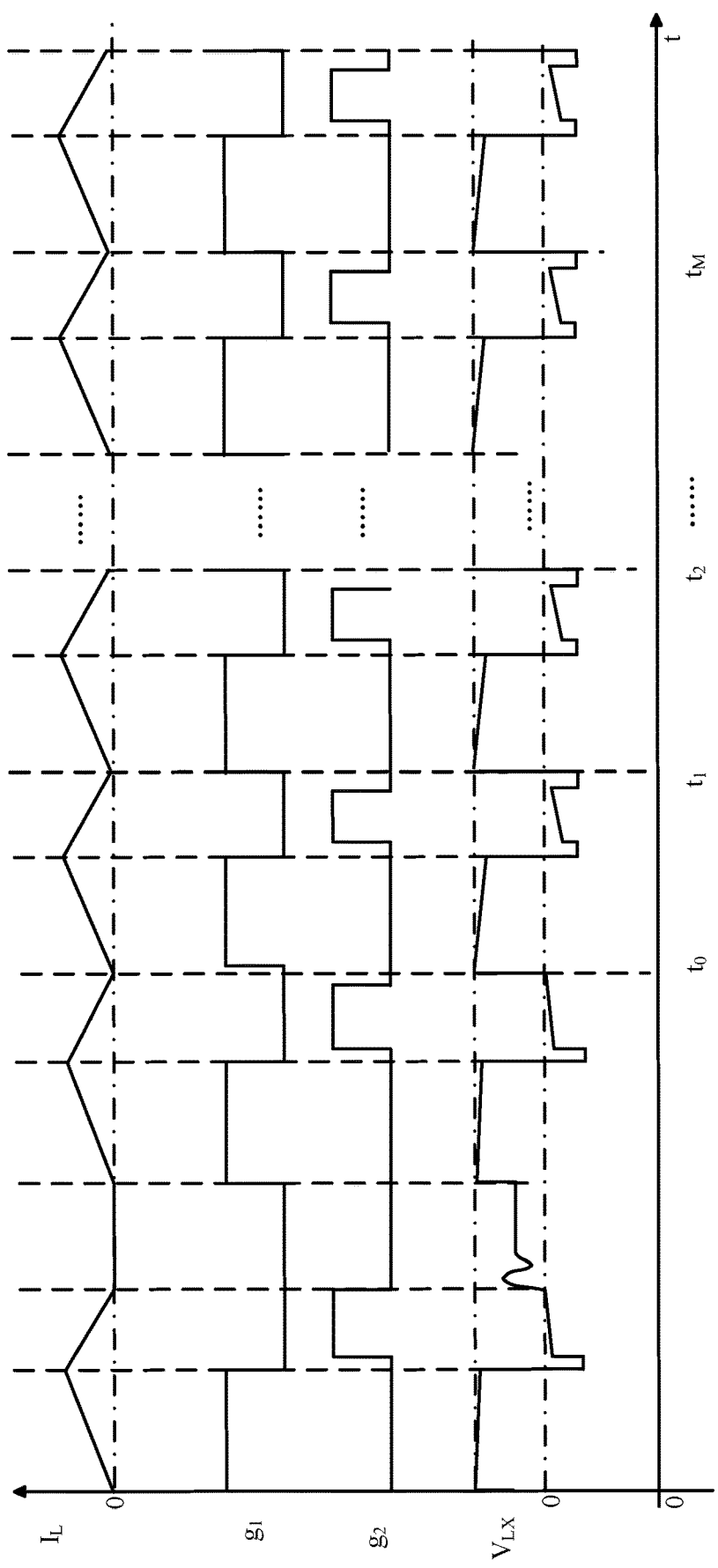
FIG. 6 is a waveform diagram of second example operation of the example mode switching circuit, in accordance with embodiments of the preset invention.

Referring now to FIG. 6, shown is a waveform diagram of second example operation of the example mode switching circuit, in accordance with embodiments of the preset invention. This particular example shows operation of the switching power supply switching from a light load to a heavy load, and the waveforms of inductor current $I_L$, driving signal g1 of main power switch $G_1$, driving signal g2 of synchronous switch $G_2$, and voltage $V_{LX}$ at terminal LX varying with time are shown from top to bottom. Before time $t_0$, the switching power supply can operate in a DCM in the first mode. When synchronous switch $G_2$ is turned off (e.g., corresponding to the falling edge of driving signal g2), inductor current $I_L$ may be equal to zero, such that body diode D is off, and voltage $V_{LX}$ at terminal LX is close to zero. Therefore, detection signal $D_{det}$ can be inactive, and the switching power supply may operate under the light load condition.

When the load becomes heavier, inductor current $I_L$ can gradually increase. At time $t_0$, the switching power supply can enter into a CCM, inductor current $I_L$ may be slightly greater than zero when synchronous switch $G_2$ is turned off, and inductor current $I_L$ can continue to flow through body diode D of synchronous switch $G_2$ for freewheeling, such that Voltage $V_{LX}$ at terminal LX is equal to the conduction voltage drop of body diode D (e.g., a negative value). In this way, counter 1 can count up when detection signal $D_{det}$ generated by the detection circuit is detected to be active in each cycle (e.g., when body diode D is turned on). At time $t_M$, counter 1 may have continuously counted m times (e.g., 5 times), and the switching power supply can be controlled by the control circuit to switch to the second mode. In this example, the switching power supply can be accurately switched from the first mode to the second mode in the critical region of inductor current $I_L$ (e.g., close to zero) when the load switches from a light load to a heavy load, thereby substantially avoiding the low efficiency caused by continuously operating in FCCM under the light load condition, and preparing for the load to transition from a light load to a heavy load.

The embodiments can determine the condition of the load by determining whether the body diode of the synchronous switch is turned on when the synchronous switch is turned off, and can control the switching power supply to switch between the first mode and the second mode when the load transitions, thereby suppressing overshoot of the output voltage while ensuring the efficiency of the switching power supply.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A mode switching circuit for a switching power supply having a power switch and a synchronous switch, the mode switching circuit being configured to:
    a) control the switching power supply to switch between a first mode and a second mode in response to a transitioning of a load of the switching power supply, in order to suppress overshoot of an output voltage of the switching power supply;
    b) wherein an inductor current of the switching power supply is not less than zero in the first mode;
    c) wherein the inductor current is allowed to be less than zero in the second mode; and
    d) wherein when the load of the switching power supply switches from a heavy load to a light load, the switching power supply is controlled by the mode switching circuit to operate in a forced continuous conduction mode (FCCM) in the second mode for a predetermined number of cycles, and to switch to a discontinuous conduction mode (DCM) in the first mode after the predetermined number of cycles.

2. The mode switching circuit of claim 1, wherein the switching power supply is controlled by the mode switching circuit to switch from the second mode to the first mode when the load of the switching power supply transitions from a heavy load to a light load.

3. The mode switching circuit of claim 1, wherein the switching power supply is controlled by the mode switching circuit to switch from the first mode to the second mode when the load of the switching power supply transitions from a light load to a heavy load.

4. The mode switching circuit of claim 1, wherein when the load of the switching power supply transitions from a light load to a heavy load, the switching power supply is controlled by the mode switching circuit to:
    a) operate in a continuous conduction mode (CCM) in the first mode for a predetermined number of cycles; and
    b) operate in the CCM in the second mode after the predetermined number of cycles.

5. The mode switching circuit of claim 1, wherein the mode switching circuit comprises:
    a) a detection circuit configured to determine whether a body diode of the synchronous switch is turned on when the synchronous switch is turned off, in order to generate a detection signal; and
    b) a control circuit configured to control the switching power supply to operate in one of the first mode and the second mode in response to the detection signal.

6. The mode switching circuit of claim 5, wherein the control circuit comprises a counting unit configured to generate first and second mode switching signals in response to the detection signal, in order to control the switching power supply to switch between the first mode and second mode.

7. The mode switching circuit of claim 6, wherein when a number of inactive detection signals continuously detected by the counting unit reaches a predetermined value, the first mode switching signal is generated to control the switching power supply to switch to the first mode.

8. The mode switching circuit of claim 6, wherein when a number of active detection signals continuously detected by the counting unit reaches a predetermined value, the second mode switching signal is generated to control the switching power supply to switch to the second mode.

9. The mode switching circuit of claim 6, wherein the control circuit further comprises a control unit configured to receive the first and second mode switching signals, and to generate driving signals for controlling the power switch and the synchronous switch, respectively, such that the switching power supply switches between the first mode and second mode.

10. The mode switching circuit of claim 5, wherein the detection circuit comprises a comparator configured to determine whether the body diode of the synchronous switch is turned on in accordance with a voltage across the synchronous switch and a threshold voltage.

11. A mode switching method of controlling a switching power supply having a power switch and a synchronous switch, the method comprising:
   a) controlling the switching power supply to switch between a first mode and a second mode for suppressing overshoot of an output voltage of the switching power supply when a load of the switching power supply transitions;
   b) wherein an inductor current of the switching power supply is not less than zero in the first mode;
   c) wherein the inductor current is allowed to be less than zero in the second mode; and
   d) wherein when the load of the switching power supply switches from a heavy load to a light load, the switching power supply is controlled by the mode switching circuit to operate in a forced continuous conduction mode (FCCM) in the second mode for a predetermined number of cycles, and to switch to a discontinuous conduction mode (DCM) in the first mode after the predetermined number of cycles.

12. The method of claim 11, wherein the switching power supply is controlled by the mode switching circuit to switch from the second mode to the first mode when the load of the switching power supply switches from a heavy load to a light load.

13. The method of claim 11, wherein the switching power supply is controlled by the mode switching circuit to switch from the first mode to the second mode when the load of the switching power supply switches from a light load to a heavy load.

14. The method of claim 11, wherein when the load of the switching power supply switches from a light load to a heavy load, the switching power supply is controlled by the mode switching circuit to operate in a continuous conduction mode (CCM) in the first mode for a predetermined number of cycles, and to operate in the CCM in the second mode after the predetermined number of cycles.

15. The method of claim 11, further comprising:
   a) generating a detection signal by determining whether a body diode of the synchronous switch is turned on when the synchronous switch is turned off; and
   b) controlling the switching power supply to switch between the first mode and the second mode in response to the detection signal.

16. The method of claim 15, wherein the controlling the switching power supply to switch between the first mode and the second mode in response to the detection signal comprises generating first and second mode switching signals in response to the detection signal, in order to control the switching power supply to switch between the first mode and second mode.

17. The method of claim 16, wherein the generating first and second mode switching signals in response to the detection signal comprises:
   a) generating a first mode switching signal for controlling the switching power supply to switch to the first mode when the number of inactive detection signals continuously detected by the counting unit reaches a predetermined value; and
   b) generating a second mode switching signal for controlling the switching power supply to switch to the second mode when the number of active detection signals continuously detected by the counting unit reaches a predetermined value.

18. The method of claim 16, wherein whether the body diode of the synchronous switch is turned on is determined in accordance with a voltage across the synchronous switch and a threshold voltage.

* * * * *